United States Patent [19]

Rehbein et al.

[11] Patent Number: 4,678,215

[45] Date of Patent: Jul. 7, 1987

[54] SAFETY LATCHING ASSEMBLY FOR ELECTRONICS EQUIPMENT WITH EXTERNAL BATTERY PACK

[75] Inventors: Clayton J. Rehbein, Chandler; Leland B. Battin, Jr., Scottsdale, both of Ariz.

[73] Assignee: Motorola Inc., Schaumburg, Ill.

[21] Appl. No.: 864,241

[22] Filed: May 19, 1986

[51] Int. Cl.[4] .............................................. E05C 5/02
[52] U.S. Cl. ............................. 292/247; 292/341.18; 220/89 A; 429/177
[58] Field of Search .......... 292/247, 341.18, DIG. 44, 292/DIG. 65; 220/89 A; 361/392, 393, 394; 429/172, 177

[56] References Cited

U.S. PATENT DOCUMENTS

| | | | |
|---|---|---|---|
| 2,713,506 | 7/1955 | Wickstrom | 292/341.18 |
| 2,991,106 | 7/1961 | Claud-Mantle | 292/247 X |
| 3,338,612 | 8/1967 | Howard | 292/DIG. 44 X |
| 3,788,514 | 1/1974 | Giacoma, Jr. et al. | 220/89 A |
| 4,307,906 | 12/1981 | Schenk | 292/247 |
| 4,453,197 | 6/1984 | Burrage | 220/89 A |

Primary Examiner—Richard E. Moore
Attorney, Agent, or Firm—E. A. Parsons

[57] ABSTRACT

An external battery pack held in sealing engagement with electronics equipment by a safety latching assembly including a guide frame having a strike plate slideably engaged therein with the strike plate held in an operative position by a shear pin constructed to shear when internal gases in the battery reach a sufficient pressure. Shearing the pin allows the strike plate to move to an open position wherein the battery is vented to the atmosphere.

8 Claims, 5 Drawing Figures

SAFETY LATCHING ASSEMBLY FOR ELECTRONICS EQUIPMENT WITH EXTERNAL BATTERY PACK

BACKGROUND OF THE INVENTION

Lithium Sulfur Dioxide batteries ($Li/SO_2$) have become the prime battery candidate for use in portable and remote communications equipment because of their high energy density and long shelf life. However, potential problems exist with these batteries. Under unusual circumstances, the internal temperature of the battery may rise causing the lithium anode inside to melt. This, in turn, reacts with other cell components causing a runaway reaction to occur. The temperature will continue to rise until the cell case opens up either mildly or violently, venting the internal gases to the atmosphere. When enclosing these batteries within a hermetically sealed housing, a means of allowing the gas to exhaust from the housing is necessary. Failure to do so can cause dangerous internal pressure levels to occur in the housing within seconds. In some reported cases, the sealed battery housing has literally become a flying projectile detached from the communication device. The present invention enables a worst case battery failure to occur safely while retaining the battery and battery housing to the communications device and still allowing the battery housing to vent.

SUMMARY OF THE INVENTION

The present invention pertains to an external battery pack held in sealing engagement with portable and/or remote electronics equipment by a safety latching assembly including a guide frame fixedly attached to the side of either the battery pack or the electronics equipment and a strike plate slideably engaged by the guide frame for movement between an operative position and an open position, a shear pin is engaged transversely through the strike plate to hold the strike plate normally in the operative position, and a catch is mounted on the other side of the battery pack or electronics equipment to engage the strike plate and cam the battery pack and electronics equipment into sealing engagement. When the pressure in the battery exceeds a predetermined amount the shear pin is sheared and the strike plate is free to move to the open position which opens the seal between the battery pack and the electronics equipment and vents the battery pack to the atmosphere.

It is an object of the present invention to provide a new and improved safety latching assembly for sealingly engaging an external battery pack with portable and/or remote electronics equipment.

It is a further object of the present invention to provide a safety latching assembly which allows an external battery pack sealingly engaged with portable and/or remote electronics equipment to vent to the atmosphere under extreme internal pressure conditions.

These and other objects of this invention will become apparent to those skilled in the art upon consideration of the accompanying specification, claims and drawings.

BRIEF DESCRIPTION OF THE DRAWINGS

Referring to the drawings, wherein like parts are indicated with like numbers.

DESCRIPTION OF THE PREFERRED EMBODIMENT

Figure 1:
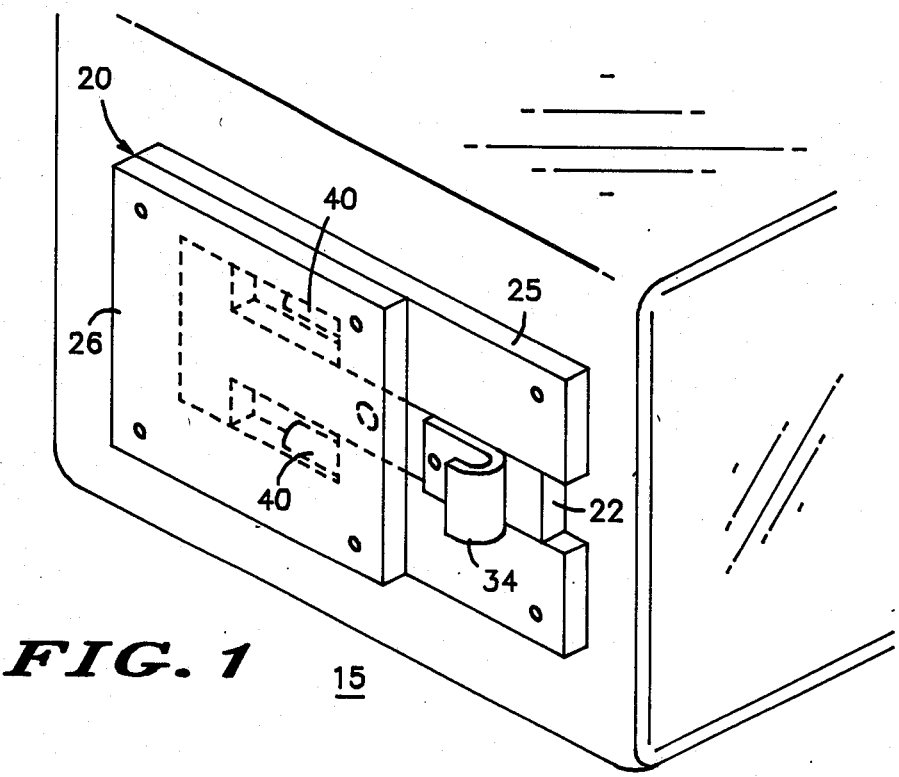
FIG. 1 is a view in perspective of a safety latching assembly embodying the present invention.
Figure 2:
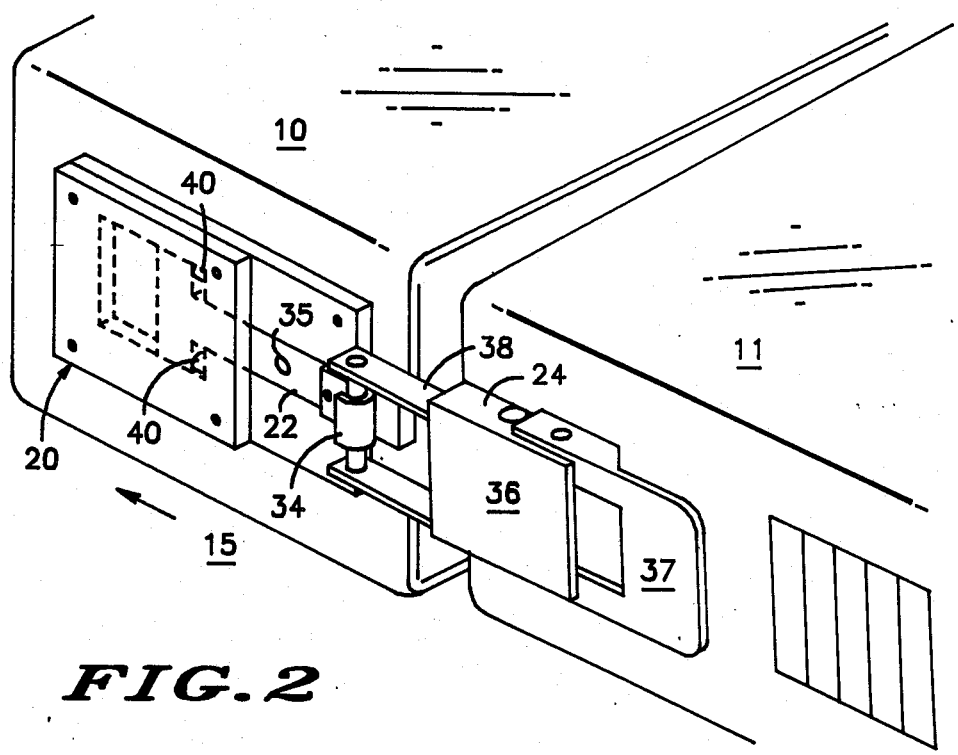
FIG. 2 is a view in perspective of the safety latching assembly of FIG. 1 in the sheared or open position.

Referring specifically to FIGS. 1 and 2, an external battery pack 10 and portable and/or remote electronics equipment 11 adapted to mate with battery pack 10 along adjacent sides is illustrated. It will be immediately apparent to those skilled in the art that battery pack 10 and electronics equipment 11 could be reversed in position without altering the operation of the present invention. In this embodiment battery pack 10 is maintained in engagement with electronics equipment 11 by means of a latching assembly on the far surface (not shown) which may simply be a standard latching assembly. A safety latching assembly generally designated 15 is attached to the front surfaces of battery pack 10 and electronics equipment 11 for maintaining battery pack 10 sealingly engaged with electronics equipment 11 under normal operating conditions. While the present disclosure illustrates a safety latching assembly only on the front surfaces of battery pack 10 and electronics equipment 11, it will be understood by those skilled in the art that a similar safety latching assembly might be utilized on the rear surface also if additional venting were deemed to be desirable. However, it is believed that a single safety latching assembly on one side of battery pack 10 and electronics equipment 11 is sufficient to provide all of the venting required.

Figure 3:
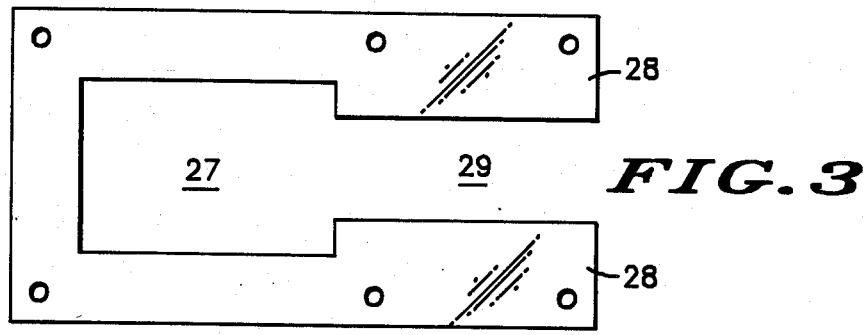
FIGS. 3, 4 and 5 are views in top plan of components of the safety latching assembly illustrated in FIG. 1.
Figure 5:
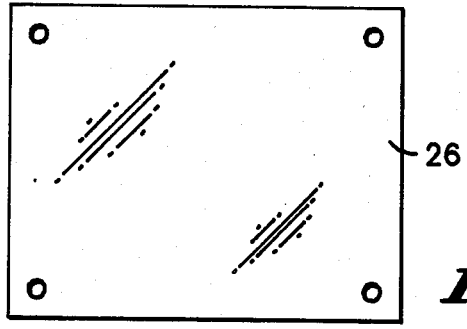

Safety latching assembly 15 includes a guide frame 20, a strike plate 22 and a catch 24. Guide frame 20 includes a generally U shaped element 25, illustrated in top plan in FIG. 3, and a rectangular cover 26, illustrated in top plan in FIG. 5.

U-shaped member 25 defines a generally centrally located opening 27 which in this particular embodiment is rectangular in shape. The ends of the arms forming U-shaped member 25 have inwardly directed side portions 28 which define an exit 29 from central opening 27. Side portions 28 are transversely inwardly stepped so that the width of exit 29 is less than the width of central opening 27. Six holes are formed in U shaped element 25 for riveting or bolting element 25 to the side of battery pack 10.

Figure 4:
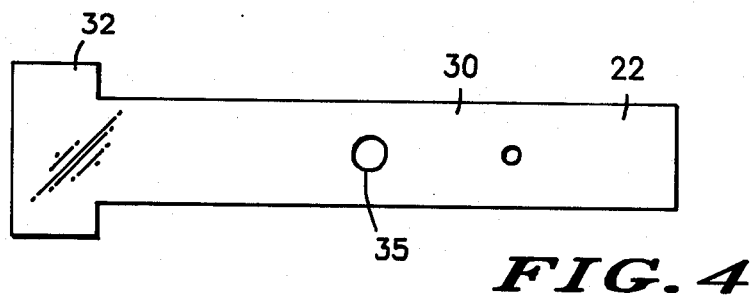

Strike plate 22 (see FIG. 4) has an elongated body 30 with an enlarged portion 32 at one end thereof. The opposite end of the elongated body 30 has a pair of holes formed therein so that a clasp 34 (see FIGS. 1 and 2) can be fixedly attached thereto by some convenient means, such as rivets or the like. A third hole 35 is formed in elongated body 30 to slightly smaller than the width of exit 29 between side portions 28 of U-shaped frame 25. The width of enlarged portion 32 of strike plate 22 is slightly smaller than the width of central opening 27 in U shaped element 25 and larger than the width of exit 29. Strike plate 22 is slideably engaged in U shaped element 25 with enlarged portion 32 situated in central opening 27. Thus, it can be seen that strike plate 22 will be moveable between a position wherein enlarged portion 32 is adjacent the bight of U shaped element 25 and a second position wherein the shoulders of enlarged portion 32 butt against the shoulders of side portions 28 of U-shaped element 25 to produce a stopping action.

With strike plate 22 slideably positioned in U-shaped elements 25 and cover 26 is positioned in overlying relationship on U shaped element 25 with the four holes therethrough coaxially aligned with the four holes adjacent the bight of U shaped element 25. The apparatus to be used to hold U shaped element 25 on the side of battery pack 10, e.g. screws, bolts, rivets, etc., will also be inserted through cover 26. Cover 26 holds the assembly together by encapsulating it and prevents foreign material from entering the assembly.

Strike plate 22, U shaped element 25 and cover 26 may all be stamped from sheet metal, such as aluminum or the like, for ease of manufacturing. Since strike plate 22 and U shaped element 25 are stamped from the same material, a shim is constructed similar to U shaped element 25 and positioned between U shaped element 25 and the side of battery pack 10. This allows for free sliding movement of strike plate 22. The shim (not shown) may be constructed of some convenient thin material, such as stainless steel or the like. In general, strike or clasp 34 is riveted to the side of battery pack 10. The rivet riveting strike plate 22 to the side of battery pack 10 is sized to shear below the weakest link of the entire assembly.

Catch 24 includes a base member 36 affixed to the side of electronics equipment 11, a cam acting, locking handle 37 and an elongated U shaped catching member 38. Member 38 engages clasp 34 and is cammed to the right in FIG. 2 by the action of handle 37 being rotated toward electronics equipment 11, into the closed, or locked, position. Thus, handle 37 draws battery pack 10 into tight sealing engagement with electronics equipment 11.

A pair of crushable cushions 40 are positioned between the shoulders formed by enlarged portion 32 of strike plate 22 and the shoulders formed by side portions 28 of U shaped element 25. Crushable cushions 40 are formed as elongated pins of a material sufficiently hard to absorb the energy generated when the shear pin is sheared and strike plate 22 moves toward the second or open position. In this particular embodiment crushable cushions 40 are constructed of tetrafluoroethylene resin (Teflon). Crushable cushions 40 are held in place by cover 26 and decelerate battery pack 10 after the shear pin is sheared and battery pack 10 moves away from electronics equipment 11. Battery pack 10 stops after crushable cushions 40 have been crushed and the shoulders of strike plate 22 are generally engaged by the shoulders formed by side portions 28 of U shaped element 25. When the battery fails by venting its gases to the internal atmosphere of battery pack 10, the internal pressure will build-up quickly (less than one second in a worst case). As the pressure increases, the shear force of the shear pin is approached. When the shear pin shears, battery pack 10 moves rearwards breaking the seal between battery pack 10 and electronics equipment 11. Crushable cushions 40 dissipate the major portion of the energy during the crushing action so that safety latching assembly 15 retains battery pack 10 connected to electronics equipment 11, but vented to the atmosphere by the opening therebetween.

Thus, an improved safety latching assembly for sealably engaging a battery pack to portable and/or remote electronics equipment is disclosed. The safety latching assembly moves to an open position under extreme internal pressure so that the battery pack may be vented to the atmosphere while retained in connection with the electronics equipment. Thus, potentially violent explosions and the like are avoided by the safety latching assembly.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. In conjunction with portable and/or remote electronics equipment having an external battery pack sealingly attached thereto, a safety latching assembly comprising:

a guide frame fixedly attached to a side of one of the battery pack and the electronics equipment, said guide frame defining a central opening with a predetermined width and side portions defining an exit with a reduced width, the exit being directed generally toward the other of the battery pack and the electronics equipment;

a strike plate having a elongated body with a width smaller than the reduced width of the exit and with an enlarged portion having a width larger than the exit and smaller than the central opening adjacent one end thereof and a clasp portion adjacent an opposite end thereof, the elongated body being slideably engaged in the exit of the central opening of said guide frame with the enlarged portion being positioned in the central opening and the clasp portion being positioned outside the exit of the central opening, said strike plate being slideable between a first position in which the enlarged portion of the elongated body is spaced into the central opening from the side portions of the guide frame and a second position in which the enlarged portion of the elongated body is in abutting engagement with the side portions of the guide frame;

a shear pin extending transversely through said strike plate and holding said strike plate in the first position; and a catch mounted on the other of the battery pack and the electronics equipment so as to be engaged with the clasp portion of the elongated body of said strike plate, said catch including a cam acting lock having open and locked positions, said catch being mounted to draw said strike plate toward said catch in the locked position and thereby seal the battery pack and electronics equipment together.

2. A safety latching assembly as claimed in claim 1 wherein the shear pin is sized to shear below a weakest link in the electronics equipment, the battery pack, and the safety latching assembly.

3. A safety latching assembly as claimed in claim 2 having in addition crushable cushion means positioned between the side portions of the guide frame and the enlarged portion of the strike plate.

4. A safety latching assembly as claimed in claim 3 wherein the crushable cushion means includes a pair of elongated pins formed primarily of tetrafluoroethylene resin.

5. A safety latching assembly as claimed in claim 1 wherein the guide frame and strike plate are formed of punched sheet metal parts.

6. A safety latching assembly as claimed in claim 5 wherein the guide frame includes a generally U-shaped element and a rectangular cover positioned in overlying relationship thereon to define the central opening.

7. A safety latching assembly as claimed in claim 6 wherein the enlarged portion of the strike plate includes generally transversely extending shoulders, which shoulders operate as stops when the strike plate moves from the first toward the second position.

8. A safety latching assembly as claimed in claim 7 wherein the side portions of the guide frame are transversely inwardly directed shoulders constructed to substantially mate with the shoulders of the strike plate.

* * * * *